US009201154B2

(12) United States Patent
Poole et al.

(10) Patent No.: US 9,201,154 B2
(45) Date of Patent: Dec. 1, 2015

(54) DEVICE AND METHOD FOR DENOISING OCEAN BOTTOM DATA

(75) Inventors: Gordon Poole, East Grinstead (GB); Sergio Grion, Horley (GB)

(73) Assignee: CGGVERITAS SERVICES SA, Massy Cedex (FR)

( * ) Notice: Subject to any disclaimer, the term of this patent is extended or adjusted under 35 U.S.C. 154(b) by 1008 days.

(21) Appl. No.: 13/337,491

(22) Filed: Dec. 27, 2011

(65) Prior Publication Data

US 2013/0163377 A1 Jun. 27, 2013

(51) Int. Cl.
G01V 1/38 (2006.01)
G01V 1/36 (2006.01)

(52) U.S. Cl.
CPC . *G01V 1/368* (2013.01); *G01V 1/38* (2013.01); *G01V 2210/244* (2013.01); *G01V 2210/324* (2013.01)

(58) Field of Classification Search
CPC .................................................. G01V 1/3808
USPC ............................................................ 367/24
See application file for complete search history.

(56) References Cited

U.S. PATENT DOCUMENTS

| 6,832,161 | B1 * | 12/2004 | Moore | 702/17 |
|---|---|---|---|---|
| 2005/0180262 | A1 * | 8/2005 | Robinson | 367/47 |
| 2008/0221801 | A1 * | 9/2008 | Craft et al. | 702/17 |
| 2011/0213556 | A1 * | 9/2011 | Yu et al. | 702/14 |

FOREIGN PATENT DOCUMENTS

| EP | 1 217 390 A1 | 6/2006 |
|---|---|---|
| WO | 2008/112462 A2 | 9/2008 |

OTHER PUBLICATIONS

John Brittan, et al.; "Applications of adaptive noise attenuation to dual sensor seismic data"; PGS Geophysical; SEG Annual Meeting; Oct. 26-31, 2003; Dallas, Texas.
Zhou Yu, et al.; "Ocean bottom seismic noise attenuation using local attribute matching filter"; SEG 2011 Annual Meeting; Sep. 18-23, 2011; pp. 3586-3590; San Antonio, TX.
Bill Dragoset; "Geophysical Applications of adaptive-noise Cancellation"; 1998 SEG Annual Meeting, Sep. 13-18, 1998, New Orleans, Louisiana: pp. 1389-1392.
E. Zabihi Naeini et al., "Enhanced Wavefield Separation of OBS Data"; 73rd EAGE Conference & Exhibition Incorporating SPE EUROPEC 2011; Vienna, Austria, May 23-26, 2011.
K.L. Craft, "Geophone Noise Attenuation and Wave-Field Separation Using a Multi-dimensional Decomposition Technique"; 70th EAGE Conference & Exhibition ; Rome, Italy, Jun. 9-12, 2008.
Daniel Trad et al., "Latest Views of the Sparse Radon Transform"; Geophysics vol. 68., No. 1 Jan.-Feb. 2003; pp. 386-399.

* cited by examiner

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

Computing device, computer instructions and method for denoising marine seismic data recorded with first and second seismic sensors. The method includes receiving first seismic data recorded with the first sensor in a time-space domain; receiving second seismic data recorded with the second sensor in the time-space domain, calculating with a processor models of the first and second seismic data in a transform domain that is different from the time-space domain; calculating in the transform domain an energy related to a downgoing energy based on the models of the first and second seismic data; determining a noise in the transform domain corresponding to the second seismic data based on the calculated energy; reverse transforming the noise from the transform domain into the time-space domain; and denoising the second seismic data by subtracting the noise in the time-space domain from the second seismic data.

20 Claims, 7 Drawing Sheets

DEVICE AND METHOD FOR DENOISING OCEAN BOTTOM DATA

BACKGROUND

1. Technical Field

Embodiments of the subject matter disclosed herein generally relate to methods and systems and, more particularly, to mechanisms and techniques for removing noise from seismic data recorded underwater by a seismic receiver.

2. Discussion of the Background

Marine seismic data acquisition and processing generate an image of a geophysical structure (subsurface) under the seafloor. While this image/profile does not provide a precise location for oil and gas reservoirs, it suggests, to those trained in the field, the presence or absence of oil and/or gas reservoirs. Thus, providing a high resolution image of the subsurface is an ongoing process for the exploration of natural resources, including, among others, oil and/or gas.

A traditional marine system for recording seismic waves is illustrated in FIG. 1, and this system is described in European Patent No. EP 1 217 390, the entire content of which is incorporated herein by reference. In this document, plural seismic receivers 10 are removably attached to a pedestal 12 together with a memory device 14. Plural such receivers are deployed on the bottom 16 of the ocean. A source vessel 18 tows a seismic source 20 that is configured to emit seismic waves 22 and 24. Seismic waves 22 propagate downward, toward the ocean bottom 16. After being reflected from a structure 26, the seismic wave (primary) is recorded (as a trace) by the seismic receiver 10 while the seismic waves 24 reflected at the water surface 28 are detected by the receivers 10 at a later time. Since the interface between the water and air is well approximated as a quasi-perfect reflector (i.e., the water surface acts as a mirror for the acoustic or seismic waves), the reflected wave 24 travels back toward the receiver 10. This reflected wave is traditionally referred to as a ghost wave because this wave is due to a spurious reflection. The ghosts are also recorded by the receivers 10, but with a different polarization and a time lag relative to the primary wave 22. As the primary wave 22 moves in an upward direction toward the receiver 10, this wave is sometimes called up-going wave-field and as the ghost 24 moves in a downward direction toward the receiver 10, this wave is sometimes called down-going wave-field. Thus, in the following, the term up-going wave-field is used interchangeably with the term primary and the term down-going wave-field is used interchangeably with the term ghost.

FIG. 1 also shows the receiver 10 being configured to detach from the pedestal 12 and to float to the water surface 28 for collection by a collection boat 30. Based on the data collected by the receiver 10, an image of the subsurface is generated by further analyses of the collected data.

As discussed above, every arrival of a marine seismic wave at receiver 10 is accompanied by a ghost reflection. In other words, ghost arrivals trail their primary arrival and are generated when an upward-traveling wave is recorded a first time on submerged equipment before being reflected at the surface-air contact.

The time delay between an event and its ghost depends entirely upon the depth of the receiver 10 and the wave velocity in water (this can be measured and considered to be approximately 1500 m/s). It can be only a few milliseconds for towed streamer data (depths of less than 15 meters) or up to hundreds of milliseconds for deep Ocean Bottom Cable (OBC) and Ocean Bottom Node (OBN) acquisitions. The degenerative effect that the ghost arrival has on seismic bandwidth and resolution is known. In essence, interference between primary and ghost arrivals causes notches or gaps in the frequency content, and these notches cannot be removed without the combined use of advanced acquisition and processing techniques.

Such advanced processing techniques include wave-field separation or wave-field decomposition or deghosting. These techniques require advanced data acquisition, i.e., multi-component marine acquisition. Multi-component marine acquisition uses receivers that are capable of measuring at least two different parameters, for example, water pressure (recorded with a hydrophone) and water particle acceleration or velocity (recorded with a geophone or accelerometer). Thus, multi-component marine acquisitions deliver, besides a pressure recording P, at least a vertical particle velocity (or acceleration) component Z.

However, in OBC data processing, wave-field separation results are sometimes affected by high levels of noise on the vertical component Z, while the pressure component P is generally of good quality. Nonetheless, the Z component is needed to achieve complete pre-stack wave-field separation and also to drive processes such as mirror imaging and up-down deconvolution. Thus, there is a need to attenuate the noise on the Z component so that the wave-field separation results are not affected by the noise. Standard denoising techniques either rely on the noise being random (f-x-deconvolution, projection filtering, etc.) or that the noise is distinguishable in some other way (e.g., Radon demultiple discrimination on moveout).

For example, Craft, "Geophone noise attenuation and wavefield separation using multi-dimensional decomposition technique," $70^{th}$ EAGE conference, the entire content of which is incorporated herein by reference, uses local time-slowness (tau-p) transforms of the P and Z components in small overlapping windows for different frequency bands. The envelope of the Z energy is matched to the envelope of the P energy for each window/frequency band before the results are transformed back to the time-space (t-x) domain. It is noted that the seismic data is traditionally recorded in the t-x domain. While this method is effective at removing noise which is not present in the P-component, it has the disadvantage that the Z is scaled in amplitude to look like P, which is undesirable.

Another method is described in Zabihi et al., "Enhanced wavefield separation of OBC data," $73^{rd}$ EAGE conference and exhibition, the entire content of which is incorporated herein by reference. This method uses coherency-driven blending of data in the PZ summation process to attenuate noise on the Z-component.

However, the existing methods might not preserve the signal during the processing because it is known that any mathematical transformation used to manipulate the data from one domain to another domain introduces spurious features. In addition, if sparse transforms are not used, the areas of signal and coherent noise may overlap, thus, making it impossible to isolate the noise. Therefore, there is need of a method and system that overcome the afore-described drawbacks.

SUMMARY

According to an exemplary embodiment, there is a method for denoising marine seismic data recorded with first and second seismic sensors. The method includes receiving first seismic data recorded with the first sensor in a time-space domain; receiving second seismic data recorded with the second sensor in the time-space domain, wherein the first and second seismic data are recorded at the same locations underwater; calculating with a processor models of the first and second seismic data in a transform domain that is different from the time-space domain; calculating in the transform domain an energy related to a down-going energy based on the models of the first and second seismic data; determining a noise in the transform domain corresponding to the second seismic data based on the calculated energy; reverse transforming the noise from the transform domain into the time-space domain; and denoising the second seismic data by subtracting the noise in the time-space domain from the second seismic data.

According to another exemplary embodiment, there is a computing device configured to denoise marine seismic data recorded with first and second seismic sensors. The computing device includes an interface configured to receive first seismic data recorded with the first sensor in a time-space domain and second seismic data recorded with the second sensor in the time-space domain, wherein the first and second seismic data are recorded at the same locations underwater; and a processor connected to the interface. The processor is configured to calculate with a processor models of the first and second seismic data in a transform domain that is different from the time-space domain, calculate in the transform domain an energy related to a down-going energy based on the models of the first and second seismic data, determine a noise in the transform domain corresponding to the second seismic data based on the calculated energy, reverse transform the noise from the transform domain into the time-space domain, and denoise the second seismic data by subtracting the noise in the time-space domain from the second seismic data.

According to still another exemplary embodiment, there is a computer readable medium including computer executable instructions, wherein the instructions, when executed by a processor, implement instructions for denoising marine seismic data recorded with first and second seismic sensors. The instructions correspond to the steps of the method disclosed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic data that is processed, in a pre-stack step, with sparse Radon transforms. However, the embodiments to be discussed next are not limited to these transforms, but they may be extended or used with other mathematical transforms.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a novel denoising method includes obtaining P and Z components in the tau-p domain, calculating a tau-p transform of two times a down-going energy D2, evaluating envelopes of P and D2, calculating a ratio of the envelopes of P and D2, isolating noise regions above a specified threshold based on an energy in D2 that is not present in P, calculating a noise, and subtracting the noise from the Z component in the time-space domain.

It is noted that the novel method distinguishes a coherent noise in the vertical geophone recordings (Z) from the signal based on the fact that the noise is different in the recordings (P) of the pressure sensor. As the noise is generally of limited bandwidth, in one application, a step of applying a suitable band-pass frequency filter to both the pressure and vertical geophone seismic data before denoising may be appropriate. The band-pass frequency filter helps to ensure preservation of the primary energy and makes the noise more distinguishable.

Figure 1:
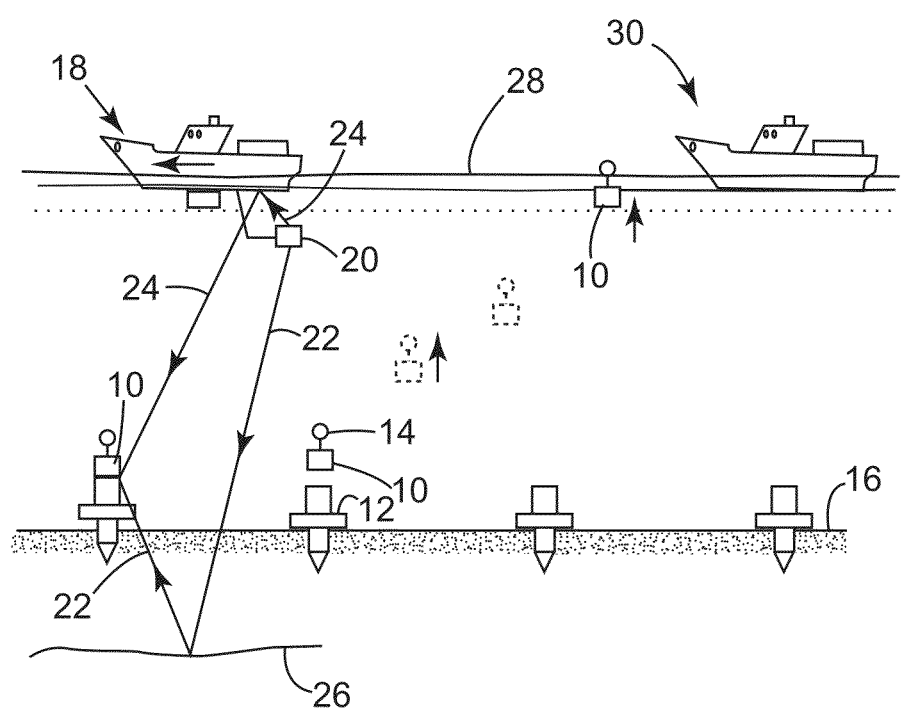
FIG. 1 is a schematic diagram of a conventional seismic data acquisition system having plural seismic receivers provided at the ocean bottom.
Figure 2:
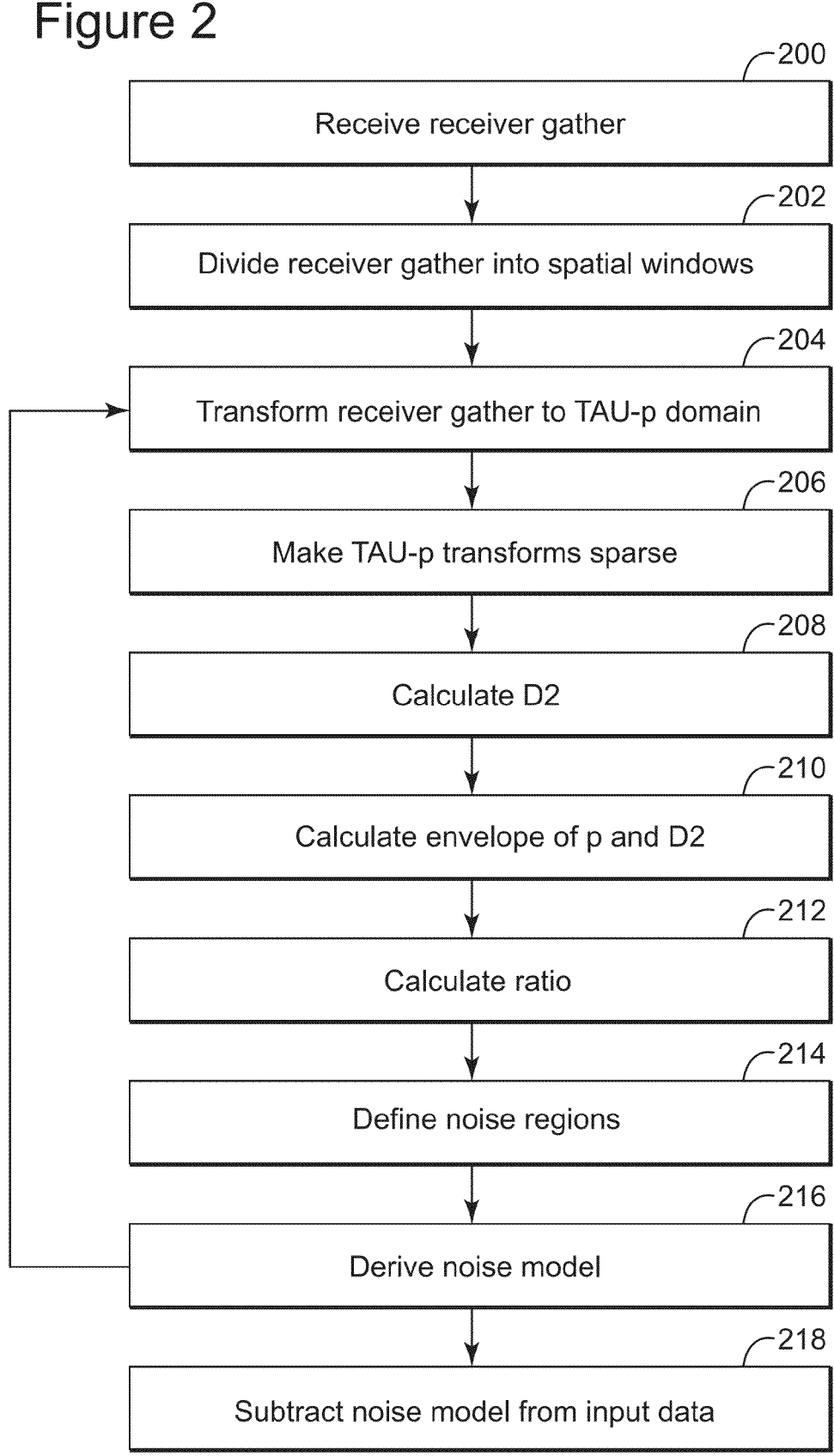
FIG. 2 is a flowchart of a method for denoising Z data according to an exemplary embodiment.

The novel method is now discussed with regard to FIG. 2. In FIG. 2, first seismic data recorded with a hydrophone ($P_0$) and second seismic data ($Z_0$) recorded with a geophone (other seismic receiver is also possible, e.g., an accelerometer) are received in step 200. The data may be received directly from a seismic survey or it may be received from a third party, e.g., through a portable storage device. The data is recorded in the time-space domain, i.e., it includes wavelets recorded at certain positions x (for simplicity only a single space component is used herein; however, three-dimensional data is handled in a similar way) and various times t. The seismic receivers (e.g., hydrophone and/or geophones) are part of plural ocean bottom nodes. Each node may include a corresponding hydrophone and one or more geophones. Thus, the $P_0$ and $Z_0$ data is recorded at the same spatial position. This data may be organized to form an ocean bottom node gather, i.e., receiver gather. The receiver gather may be three-dimensional (3-D).

The receiver gather may be divided in step 202 into 3-D overlapping spatial windows, and the steps discussed now are performed for each window. The seismic data $P_0$ and $Z_0$ is then transformed, in step 204, from the time-space domain into a tau-p domain. In another application, the seismic data is transformed to another domain. The tau-p transformed data is $P_1$ and $Z_1$.

In one application, a 3-D tau-p transform may be applied, separately, for the hydrophone and geophone windows to transform the seismic data into the tau-p domain. As described above, the 3-D tau-p transformation may rely on Radon transformation equations to transform data from the time-space domain to the 3-D tau-p domain. More specifically, the T, Y and Z data may be transformed to tau, Py and Pz along kinematic travel time trajectories having constant velocities and slownesses, where the slowness p is defined as the reciprocal of velocity (p=1/v).

The tau-p transformed seismic data $P_1$ and $Z_1$ is then made sparse (P, Z) in step 206 through weighting using, for example, a method as described in Trad et al., "Latest views of the sparse Radon transform," Geophysics, Vol. 68, No. 1, pp. 386-399, the entire content of which is incorporated herein by reference.

The sparse Radon transforms P and Z are used in step 208 to calculate the tau-p transform of an energy. The energy may be two times the down-going energy D2. In one application, the D2 energy is given by:

$$D2 = P + \frac{Z}{v_w \sqrt{\frac{1}{v_w^2} - p^2}}, \quad (1)$$

where D2 is the tau-p transform of two times the down-going energy, P is the tau-p transform of the pressure wave-field, Z is the tau-p transform of the vertical geophone wave-field, $v_W$ is the speed of sound in water (m/s), and p is the slowness of tau-p trace (s/m). The down-going transform D2 is used to improve the signal-preserving behavior by removing the up-going energy.

In step 210, an envelope of the P transform (env(P))) and an envelope of the D2 transform (env(D2)) are calculated. The envelopes may be determined using any suitable method, such as envelope calculation described in Taner et al., "Complex seismic trace analysis," Geophysics, 44, pp. 1041-1063, herein incorporated by reference. One example of envelope calculation is a Hilbert transform. The polarity-insensitive envelope may make use of the hydrophone envelope as the most noise-free template possible in subsequent steps. Then, in step 212, a ratio=env(D2)/env(P) is determined. Based on the computed envelope ratio, regions of energy above a specified threshold are identified and used in step 214 to define noise regions, i.e., energy that is present in D2 but is not present in P.

Once the noise regions have been isolated in step 214, scalars are computed which can be applied to the Z transform to derive a noise model in step 216. After the noise model is derived in step 216 for a window, the algorithm returns to step 204 for repeating the steps noted above for another spatial window until most of the windows are considered. In one application, it can be advantageous to derive scalars that taper on from a low threshold to a high threshold, i.e., threslo and threshi. These thresholds vary from application to application. The scalars are given by:

$$\text{Noise estimate} = Z \frac{(\text{ratio} - \text{threslo})}{\text{threshi} - \text{threslo}} \left(1 - \frac{1}{\text{ratio}}\right) v_w \sqrt{\frac{1}{v_w^2} - p^2}.$$

The noise model for each window is then reverse tau-p transformed and aggregated in a single noise model in step 218. After the operations described above have been performed for all of the corresponding hydrophone and geophone windows, all or a portion of the hydrophone windows may be combined, and all or some of the geophone windows may be combined to form a more complete view of the seismic data from a particular gather. Overlaps between the windows may be managed to not have an effect on the combinations. The combined processed windows may be output to any suitable medium for further data processing or display, such as a computer monitor or a printer.

In the same or different step, the calculated noise model in the time-space domain can be subtracted from the input $Z_O$ data (also in the time-space domain) to denoise this data. Having the data denoised, dedicated software is run on one or more processors for generating an image of the subsurface that was surveyed. It is noted that the data collected by the nodes discussed above is processed by a computing device modified with specific software instructions so that an image of the subsurface may be generated. The amount of data may be large, e.g., on the order of terabytes and, thus, it makes it impractical if not impossible for a person to process this data in his mind. Thus, any processing claim, if present in this application, is related to computer processing and is not intended to cover mental acts of data processing.

Therefore, the novel processing method discussed above, instead of scaling the envelope of Z to the envelope of P as traditionally performed, which has the drawback of modifying the amplitudes of Z, builds a model of the noise using the down-going energy D2, which has the advantage of working with a dataset without primary energy and, as such, is more signal-preserving.

An aspect related to the noise elimination technique is that it is desirable to not degrade the signal content. The technique described above relies on the fact that as long as the noise and signal are separated in one of the three dimensions of the tau-p domain, the signal component should be unaffected.

Figure 3:
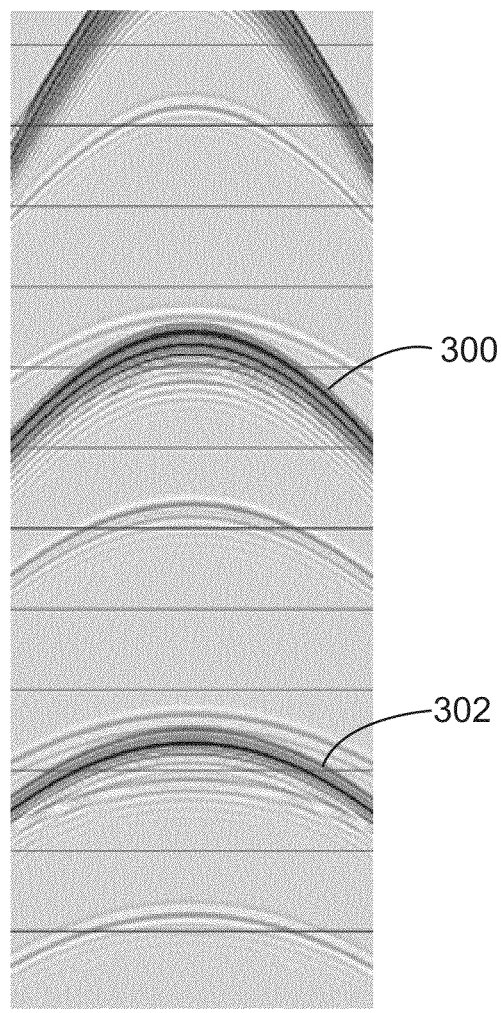
FIG. 3 is an illustration of recorded P seismic data corresponding to a given subsurface.
Figure 4:
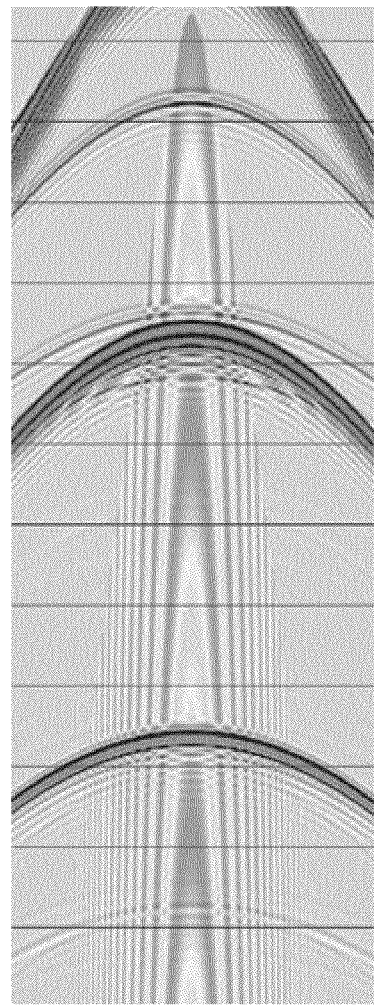
FIG. 4 is an illustration of recorded Z seismic data corresponding to the given subsurface.
Figure 5:
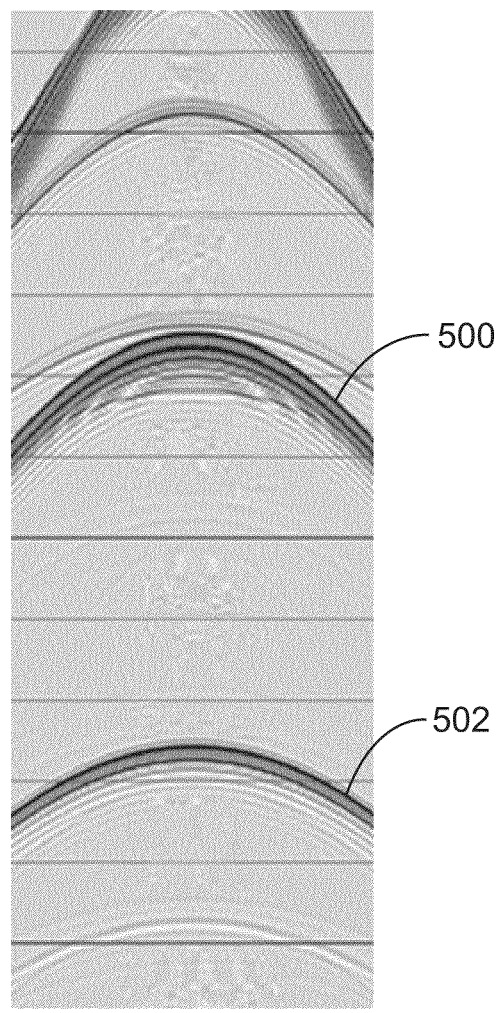
FIG. 5 is an illustration of denoised Z data corresponding to the given subsurface according to an exemplary embodiment.

A practical application of the above novel method is now discussed with reference to FIGS. 3-5. $P_O$ and $Z_O$ data was collected from a survey as illustrated in FIGS. 3 and 4, respectively. After applying the denoising method illustrated in FIG. 2, the denoised Z data is obtained as illustrated in FIG. 5. It is noted that the $P_O$ data of FIG. 3 clearly shows two events 300 and 302. The same events are contaminated by noise in the corresponding $Z_O$ data of FIG. 4. However, the events are more clearly visible in the denoised Z data shown in FIG. 5 as events 500 and 502, and most of the noise has been removed.

Figure 6:
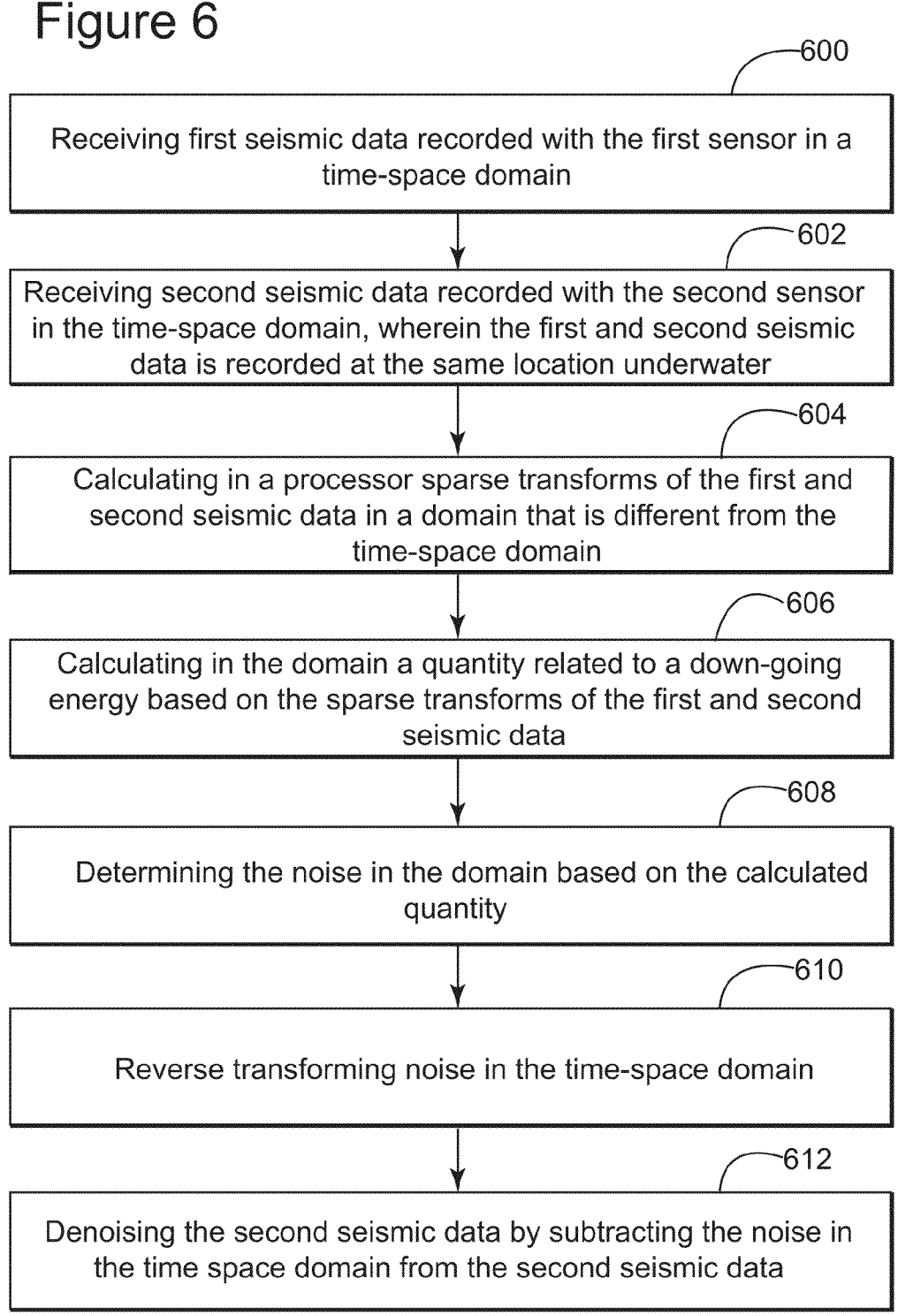
FIG. 6 is a flowchart of a method for denoising seismic data according to an exemplary embodiment.

The novel method discussed above may be implemented in a computing device as discussed later. According to an exemplary embodiment illustrated in FIG. 6, there is a method for denoising marine seismic data recorded with first and second seismic sensors. The method includes a step 600 of receiving first seismic data recorded with the first sensor in a time-space domain; a step 602 of receiving second seismic data recorded with the second sensor in the time-space domain, wherein the first and second seismic data is recorded at the same location underwater; a step 604 of calculating in a processor sparse transforms (or a model) of the first and second seismic data in a domain that is different from the time-space domain; a step 606 of calculating in the domain an energy related to a down-going energy based on the sparse transforms of the first and second seismic data; a step 608 of determining the noise in the domain based on the calculated energy; a step 610 of reverse-transforming the noise in the time-space domain; and a step 612 of denoising the second seismic data by subtracting the noise in the time-space domain from the second seismic data.

Figure 7:
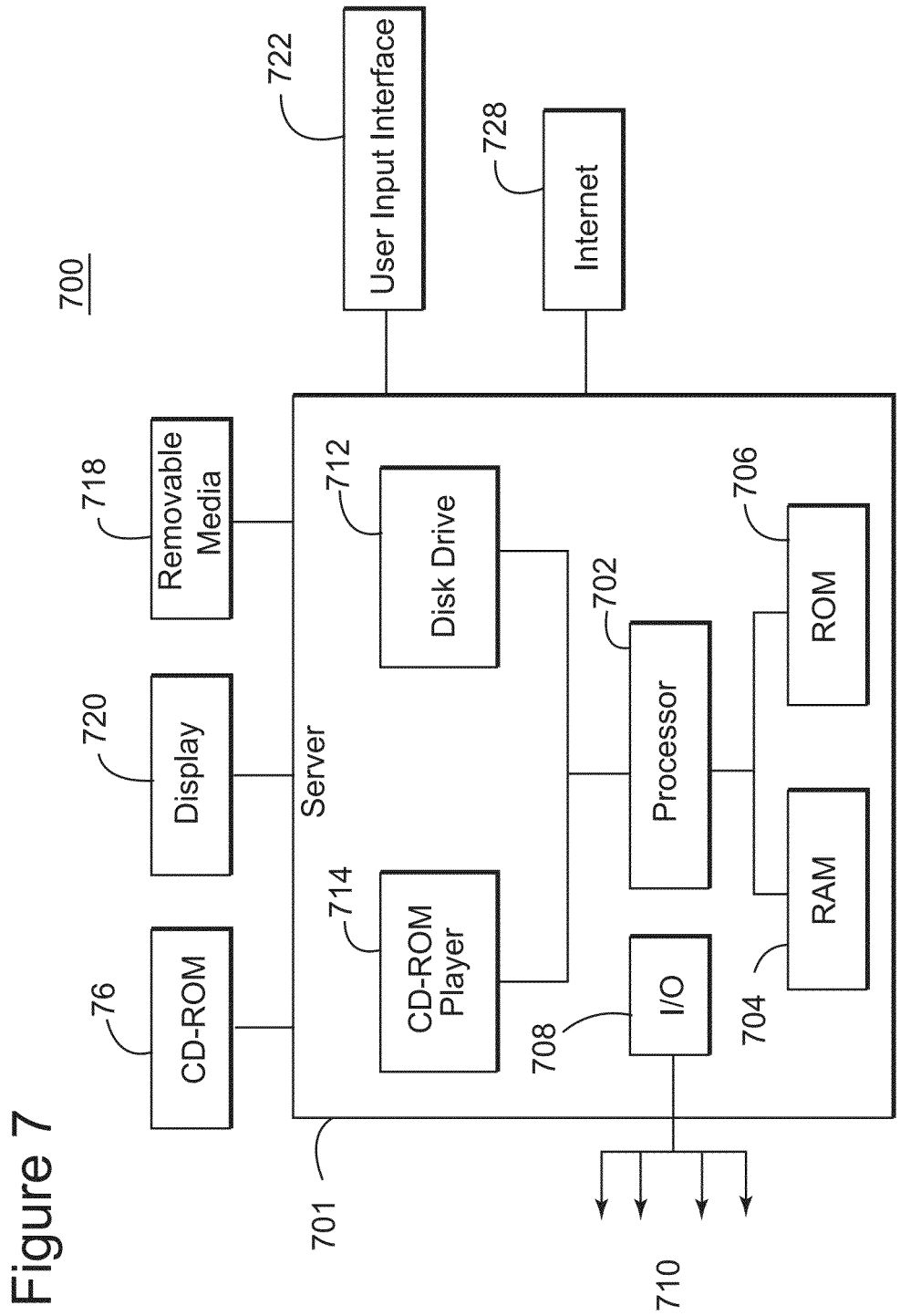
FIG. 7 is a schematic diagram of a computing device for denoising data according to an exemplary embodiment.

An example of a representative computing device capable of carrying out operations in accordance with the exemplary embodiments discussed above is illustrated in FIG. 7. Hardware, firmware, software or a combination thereof may be used to perform the various steps and operations described herein.

The exemplary computer device 700 suitable for performing the activities described in the exemplary embodiments may include server 701. Such a server 701 may include a central processor unit (CPU) 702 coupled to a random access memory (RAM) 704 and to a read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. The processor 702 carries out a variety of functions as are known in the art, as dictated by software and/or firmware instructions.

The server 701 may also include one or more data storage devices, including hard disk drives 712, CD-ROM drives 714, and other hardware capable of reading and/or storing information such as a DVD, etc. In one embodiment, software for carrying out the above-discussed steps may be stored and distributed on a CD-ROM or DVD 716, removable media 718 or other form of media capable of portably storing information. These storage media may be inserted into, and read by, devices such as the CD-ROM drive 714, the drive 712, etc. The server 701 may be coupled to a display 720, which may be any type of known display or presentation screen, such as LCD or LED displays, plasma displays, cathode ray tubes (CRT), etc. A user input interface 722 is provided, including one or more user interface mechanisms such as a mouse, keyboard, microphone, touch pad, touch screen, voice-recognition system, etc.

The server 701 may be coupled to other computing devices via a network. The server may be part of a larger network configuration as in a global area network (GAN) such as the Internet 728.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile discs (DVD), optical storage devices, or magnetic storage devices such a floppy disk or magnetic tape. Other non-limiting examples of computer readable media include flash-type memories or other known types of memories.

The disclosed exemplary embodiments provide an apparatus and a method for seismic data denoising. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for denoising marine seismic data recorded with first and second seismic sensors, the method comprising:
    receiving first seismic data recorded with the first sensor in a time-space domain;
    receiving second seismic data recorded with the second sensor in the time-space domain, wherein the first and second seismic data are recorded at the same locations underwater;
    calculating with a processor models of the first and second seismic data in a transform domain that is different from the time-space domain;
    calculating in the transform domain an energy related to a down-going energy based on the models of the first and second seismic data;
    determining a noise in the transform domain corresponding to the second seismic data based on the calculated energy;
    reverse transforming the noise from the transform domain into the time-space domain; and
    denoising the second seismic data by subtracting the noise in the time-space domain from the second seismic data.

2. The method of claim 1, wherein the first and second seismic data form a three-dimensional receiver gather.

3. The method of claim 1, further comprising:
    applying a frequency filter to the first and second seismic data to make a noise more distinguishable and help preserve a primary energy.

4. The method of claim 1, wherein the first seismic data is hydrophone data (P) and the second seismic data is geophone data (Z).

5. The method of claim 1, wherein the transform domain is a time-slowness (tau-p) domain.

6. The method of claim 1, wherein the energy is twice the down-going energy.

7. The method of claim 1, where the energy is twice the down-going energy and it is given by:

$$D2 = P + \frac{Z}{v_w\sqrt{\frac{1}{v_w^2} - p^2}},$$

where D2 is a tau-p transform of two times the down-going energy, P is a tau-p transform of a pressure wave-field that corresponds to the first seismic data, Z is a tau-p transform of a vertical geophone wave-field that corresponds to the second seismic data, $v_W$ is a speed of sound in water, and p is a slowness of a tau-p trace in the tau-p domain.

8. The method of claim 7, wherein the noise is determined by:

$$Z\frac{(\text{ratio} - \text{threslo})}{\text{threshi} - \text{threslo}}\left(1 - \frac{1}{\text{ratio}}\right)v_w\sqrt{\frac{1}{v_w^2} - p^2},$$

where the ratio is a ratio between an envelope of D2 and an envelope of P, threshi is an high predetermined threshold and threslo is a low predetermined threshold.

9. The method of claim 8, further comprising:
reverse transforming the noise to the time-space domain.

10. The method of claim 1, further comprising:
generating an image of a subsurface being survey based on the first seismic data and the denoised second seismic data.

11. A computing device configured to denoise marine seismic data recorded with first and second seismic sensors, the computing device comprising:
an interface configured to receive first seismic data recorded with the first sensor in a time-space domain and second seismic data recorded with the second sensor in the time-space domain, wherein the first and second seismic data are recorded at the same locations underwater; and
a processor connected to the interface and configured to:
calculate with a processor models of the first and second seismic data in a transform domain that is different from the time-space domain,
calculate in the transform domain an energy related to a down-going energy based on the models of the first and second seismic data,
determine a noise in the transform domain corresponding to the second seismic data based on the calculated energy,
reverse transform the noise from the transform domain into the time-space domain, and
denoise the second seismic data by subtracting the noise in the time-space domain from the second seismic data.

12. The computing device of claim 11, wherein the first and second seismic data form a three-dimensional receiver gather.

13. The computing device of claim 11, wherein the processor is further configured to:
apply a frequency filter to the first and second seismic data to make a noise more distinguishable and help preserve a primary energy.

14. The computing device of claim 11, wherein the first seismic data is hydrophone data (P) and the second seismic data is geophone data (Z).

15. The computing device of claim 11, wherein the energy is twice the down-going energy.

16. The computing device of claim 11, where the energy is twice the down-going energy and it is given by:

$$D2 = P + \frac{Z}{v_w \sqrt{\frac{1}{v_w^2} - p^2}},$$

where D2 is a tau-p transform of two times the down-going energy, P is a tau-p transform of a pressure wave-field that corresponds to the first seismic data, Z is a tau-p transform of a vertical geophone wave-field that corresponds to the second seismic data, $v_w$ is a speed of sound in water, and p is a slowness of a tau-p trace in the tau-p domain.

17. The computing device of claim 16, wherein the noise is determined by:

$$Z \frac{(\text{ratio} - \text{threslo})}{\text{threshi} - \text{threslo}} \left(1 - \frac{1}{\text{ratio}}\right) v_w \sqrt{\frac{1}{v_w^2} - p^2},$$

where the ratio is a ratio between an envelope of D2 and an envelope of P, threshi is an high predetermined threshold and threslo is a low predetermined threshold.

18. The computing device of claim 17, further comprising:
reverse transforming the noise to the time-space domain.

19. The computing device of claim 11, further comprising:
a monitor configured to display an image of a subsurface being survey based on the first seismic data and the denoised second seismic data.

20. A non-transitory computer readable medium including computer executable instructions, wherein the instructions, when executed by a processor, implement instructions for denoising marine seismic data recorded with first and second seismic sensors, the instructions comprising:
receiving first seismic data recorded with the first sensor in a time-space domain;
receiving second seismic data recorded with the second sensor in the time-space domain, wherein the first and second seismic data are recorded at the same locations underwater;
calculating with a processor models of the first and second seismic data in a transform domain that is different from the time-space domain;
calculating in the transform domain an energy related to a down-going energy based on the models of the first and second seismic data;
determining a noise in the transform domain corresponding to the second seismic data based on the calculated energy;
reverse transforming the noise from the transform domain into the time-space domain; and
denoising the second seismic data by subtracting the noise in the time-space domain from the second seismic data.

* * * * *